United States Patent [19]
Strachan

[11] Patent Number: 5,288,995
[45] Date of Patent: Feb. 22, 1994

[54] ELECTRICAL MEASUREMENT APPARATUS USING HETERODYNE PHASE CONVERSION TECHNIQUES

[75] Inventor: John S. Strachan, Edinburgh, Scotland

[73] Assignee: Optical Metrology Limited, Southampton, England

[21] Appl. No.: 11,795

[22] Filed: Feb. 1, 1993

[30] Foreign Application Priority Data

Feb. 20, 1992 [GB] United Kingdom ............... 9203588
Nov. 14, 1992 [GB] United Kingdom ............ 9223937.5

[51] Int. Cl.$^5$ ..................... G01D 5/26; G01S 17/00
[52] U.S. Cl. ........................ 250/227.12; 250/227.21; 356/5
[58] Field of Search ............. 250/227.12, 227.21, 250/205, 237 G, 560, 561; 356/4, 5, 373, 374; 359/290, 325; 342/127

[56] References Cited

U.S. PATENT DOCUMENTS

| | | | |
|---|---|---|---|
| 4,146,328 | 3/1979 | Hullein et al. | 356/5 |
| 4,229,102 | 10/1980 | Wiklund et al. | 356/5 |
| 4,639,129 | 1/1987 | Hullein et al. | 356/5 |
| 4,768,877 | 9/1988 | Torregrosa et al. | 356/5 |
| 4,829,172 | 5/1989 | Miller | 250/205 |
| 5,044,744 | 9/1991 | Ogawa et al. | 356/5 |
| 5,162,862 | 11/1992 | Bartram et al. | 356/5 |

Primary Examiner—David C. Nelms
Assistant Examiner—John R. Lee

[57] ABSTRACT

Precision displacement and load measurements dependent upon the intensity or attenuation of a signal, as by use of Moire fringe gratings or photoelastic load cells, are made using speed-of-light ranging techniques based on heterodyne frequency conversion with multiple phase-locking. Coiled optical fibres introduce phase delays in radio-frequency-modulated laser rays which are then compounded in phase by selective signal attenuation and merger. The phase is then measured by high precision circuits involving ceramic filters and translated into position or load data. Machine tool control and strain gauge applications are described. The ceramic filter circuit generates a signal measuring rate of change of displacement as a by-product, thereby facilitating measurements involving rapid motion.

14 Claims, 4 Drawing Sheets

ELECTRICAL MEASUREMENT APPARATUS USING HETERODYNE PHASE CONVERSION TECHNIQUES

FIELD OF INVENTION

In its primary application this invention relates to a new form of load cell which comprises a photoelastic element interrogated optically in a direct and simple way which affords a precise measure of the strain-related force applied to the cell when loaded. Typical uses of the load cell include weight measurement or as a means for sensing and monitoring strains in structures generally.

However, the invention in its broader sense concerns apparatus in which the relative intensities of two electrical signals having a common source and the same high frequency has to be measured with high precision and which has intrinsic features such as reliability, stability, immunity from external disturbance and adaptability for use in remote monitoring.

The invention, in its broadest sense, provides a measure of the degree of attenuation of a signal intensity which offers more reliability, precision and higher resolution than conventional measurement techniques.

Apart from the photoelastic load cell application, a typical application of the invention would be one where displacement of a carriage or test probe in a machine tool is to be measured by sensing variation in the optical intensity of a light source as seen through a Moire fringe grating system of which the movable grating shares the displacement being measured.

BACKGROUND OF THE INVENTION

The invention has evolved from research on precision range measurement by the use of a heterodyne technique of phase sensing of radio frequency modulated optical laser signals, the subject of U.S. Pat. No. 5,162,862 dated Nov. 10, 1992.

The measurement of fluctuations in the intensity of an electrical signal, particularly an optical signal, with the purpose of sensing the degree of attenuation owing to the position of some obstructing object in the signal path, is extremely difficult if the measurement is to be divorced from fluctuations of the signal source intensity. Power supply variations and temperature variations at the signal source are a major problem confronting the design of occultation systems in the machine tool industry. Whenever active components are used in electronic circuits, as for introducing a delay, the power supplies and inherent stability problems of the components can seriously impair performance.

The invention to be described exploits a technique designed to measure the phase difference between two signals, but applies this instead to a measure of relative attenuation of those signals. The resulting structure is novel and the tested result is a surprising and unexpectedly precise measure of signal attenuation with very high resolution. The technique makes possible measurements which have not hitherto been possible in industrial applications. By avoiding the use of circuits and special components previously deemed essential in such applications, there are very substantial cost savings and so the invention, in one of its applications, provides a major step forward in machine tool technology.

It is well known to measure phase by amplitude measurement and addition and this is the most common method of determining the phase difference between two equal amplitude sinusoidally varying signals. This technique is reasonably cheap to implement but has limited resolution since amplitude measurement is notoriously difficult to isolate from external influences. For this reason phase measurement is better accomplished by direct timing of the interval between the zero crossing point of one sine wave signal and the zero crossing point of the other. The resolution is then limited by the ratio between the much higher frequency of a timing clock and the frequency of the measured waves.

There is in this latter case also the problem of the speed and accuracy with which the zero crossing points can be sensed, but a very substantial advance in the technology of such measurement has recently been achieved and is the subject of the above-referenced U.S. Pat. No. 5,162,862.

The subject invention develops the latter technology in a novel way by using it indirectly as a phase measure which can, by a reverse mode of measurement, provide a measure of signal intensity attenuation cheaply and with high precision and high resolution.

Usually, when the signals are at high frequency then the phase or intensity attenuation measurement problem becomes far more difficult. However, as will be seen, a high frequency system offers scope for the use of passive components in a special way in the implementation of this invention. The result is an overwhelming advantage for the high frequency system. Indeed, the high frequency has proved a key contributer to the quality of resolution and the reliability and precision of the measurement, whilst the technology of U.S. Pat. No. 5,162,862 is brought to bear to assure precision in the phase quantity which translates into a signal attenuation measure.

As already stated, a principal specific application of the invention is in connection with photoelastic load cells but the description below will first be concerned with the more general application to sensors in precision machine tools. Here the measurement of linear displacements is now routine in automated processes. An automatic lathe, for example, may involve what are known as Moire gratings in which one grating is attached to the work and moves across a stationary grating. Light that has passed through the gratings is received by a photo-cell and varies in intensity as the movement of the work causes a Moire fringe to cross the field sensed by the photo-cell. The output of the photo-cell controls the displacement of the work in a predetermined manner as part of the regulated machining process, but the operation relies on the precise measure of position interpolated to fractions of a fringe distance. That measure is judged in terms of the light intensity as a proportion of the maximum intensity. Hence the need for precision measurement of electric signal intensity control systems used in the machine tool industry.

Another typical application is concerned with the measure of change of resistance in strain gauges attached to pipework in chemical plants, oil rigs etc. Here the variation of electric signal strength relative to a datum signal becomes a measure of mechanical strain which affects that resistance. However, the strain gauge need not be a resistance strain gauge, but could, within the terms of this invention, become one based upon optical techniques for measuring displacement, possibly also using the Moire fringe gratings. In either case, however, there is the need to measure the degree to which the intensity of a signal is affected by an attenuating action that is a measure of the physical displacement in which one is interested.

The subject of the above-reference U.S. Pat. No. 5,162,862 is a heterodyne conversion technique having novel phase-locked loop connections coordinating a master transmitter oscillator and two receiver circuits under the control of another oscillator. The disclosure suggested application as an optical radar measurement system by which the flight time of light reflected from a target is used as the measure of range. There are features of that prior invention that find application in a structure embodying the subject invention and which are essential to realise its primary advantages but, as will be seen, further inventive concepts are needed to provide an operative system as defined by this invention.

BRIEF DESCRIPTION OF THE INVENTION

It is the object of this invention to extend the scope for using the technology of that earlier invention in a non-obvious way which is specially advantageous.

According to the invention, precision measurement apparatus in which the condition or position of an optical transducer element is represented by the relative attenuation of the intensities of two optical signals both derived from a common laser source which produces a light ray amplitude-modulated at a radio frequency, comprises (a) circuit path means for dividing an input from the laser source between a plurality of circuit paths each conveying a transmitted signal at the speed of light (b) propagation delay means in at least one of the paths for retarding the respective transmitted signal, whereby the transmitted signals have different phase at the radio frequency (c) an optical transducer element positioned in the paths of the transmitted signals and operative to adjust relative signal intensity in dependence upon the state of the apparatus requiring measurement and as determined by that transducer, (d) circuit means for recombining the transmitted signals after attenuation to provide as a received signal a single electrical output, and (e) signal processing means for measuring the phase of the electrical output relative to the radio frequency modulating signal input controlling the laser and interpreting this to provide the required measurement, the signal processing means incorporating (f) heterodyne conversion means, whereby a phase-locked version of either the signal input or the electrical output is mixed with the other in each of a pair of mixer circuits to produce two throughput signals having an extended time-spaced measure of the phase.

According to a feature of the invention, the circuit path means divide the input between two circuit paths and the propagation delay means in one path comprise an extended path length which is effective at the propagation speed of the optical signal to retard its modulation waveform in that path by a quarter wavelength relative to that of the signal in the other path.

According to an alternative feature of the invention, the circuit path means divide the input between three circuit paths and the propagation delay means in two of the paths comprise extended path lengths which are effective at the propagation speed of the optical signals to retard their modulation waveforms by one third of a wavelength and two-thirds of a wavelength, respectively, relative to that of the signal in the other path.

According to another feature of the invention, the signal processing means for measuring the phase of the electrical output relative to the signal input comprise (a) timing means (b) an electronic circuit controlling the timing means and incorporating detector means responsive to said signal input and said electrical output to provide a measure of their relative phase shift, (c) signal amplitude control means for adjusting the amplitude of at least one of the electrical input or the electrical output to bring their strengths into matching relationship and (d) two separate frequency conversion means of similar design, one being connected to respond to the signal input and the other being connected to respond to the electrical output to frequency-shift both by an identical reducing amount before they are supplied to the timing means, whereby to provide the phase input to the timing means at a longer wavelength and so extend the time measure representing phase, there being two parallel circuits, one through each frequency conversion means, and each comprising a ceramic filter and a mixer circuit but the apparatus is characterized in that one ceramic filter has fine-tuning control means and is slightly offset in frequency tuning with respect to the other ceramic filter, whereby to provide a speed data signal representing the rate at which the measured phase changes, which signal provides data processing input for interpretation in the signal processing means in providing the measurement and whereby the ceramic filters each obstruct throughput of all but a pure sinusoidal signal which is fed onwards as input to a corresponding mixer circuit, where it is subjected to heterodyne downconversion of frequency by mixing with a signal of a different control frequency supplied to both mixer circuits, the resulting output signals from these two parallel circuits providing the inputs for phase difference measurement in the timing means, whereby a phase-locked version of either the signal input or electrical output is mixed with the other to produce an extended time-spaced measure of their phase difference.

According to a further feature of the invention, the optical rays from the laser source are carried by optical fibres, divided along different paths and merged into a single ray after passage through an optical occultation system and the apparatus is characterized in that the laser source has its optical output modulated in intensity sinusoidally at a high MHz frequency to provide a signal input characterized in phase by the waveform of the modulation at the MHz frequency and the propagation delay arises from the passive action of transmission through an optical fibre coiled to provide added path length, the modulation waveform being the basis of the phase-lock action when processed electronically in the heterodyne conversion means.

According to a still further feature of the invention, the heterodyne conversion means derives its signal input to the relevant mixer circuit from direct connection between the laser and a ceramic filter supplying the mixer circuit, whereby the heterodyne conversion means operates with phase-locking as between a transmitting source and both receivers comprising the two mixer circuits.

In another feature of the invention, the optical transducer element is a photoelastic sensor used for the measurement of mechanical stress, and the signal attenuation means comprise two coacting stress sensor elements formed from photo-elastic material rigidly coupled to a stress input arm which when subject to an applied force affects the stress in the two elements differentially and thereby causes the light attenuation properties of one element to vary with respect to that of the other element in measure related to the applied force.

A further feature provides that the sensor elements each have light polarizing gratings, mounted on opposite surfaces and arranged in a cross-polarized manner on these opposite surfaces in a light ray path so that in the absence of applied stress affecting an element light throughout is obstructed, but when stress is applied to modify the light polarizing action of the element the overall light attenuation property of the element changes with applied stress to thereby facilitate the stress measurement in terms of that attenuation.

An alternative feature of the invention provides that the optical transducer element is a load cell of photoelastic material, and there is a monochromatic laser source of polarized light providing input along a ray path through the load cell, the apparatus being characterized in that a plurality of polarizing filters are incorporated in light intensity sensing means positioned to sense the light output from the ray path after passage through the load cell, said light intensity sensing means being responsive to the relative intensity of the separately polarized components of the light output as supplied through the different polarizing filters, and electronic circuit means which provide output data representing a measure of that relative intensity as an indication of a stressed condition of the load cell.

In this latter form the apparatus may be further characterized in that it incorporates two laser sources having different monochromatic frequencies which provide two optical signals which provide a supplementary test facility to supplement the primary measure using a single laser source, the two optical signals being, for the purpose of this supplementary test, merged into a composite light ray as input to the load cell, both optical signals being amplitude-modulated by the same radio frequency signal, whereby, owing to the extended wavelength of their beat period, a beat frequency signal set up between the two monochromatic frequencies serves as a fine measure of a load condition producing that stress condition, thereby increasing the resolution sensitivity of the measurement.

Other features of the invention will be evident from the following description by reference to the accompanying drawings.

DETAILED DESCRIPTION OF THE INVENTION

The invention will first be described by reference to an embodiment which utilises a Moire fringe grating system to measure displacement of a work carriage in a machine tool. In effect, this optical grating system is used as an encoder by which to generate the signal data by which the displaced position of the work carriage is encoded.

Figure 1:
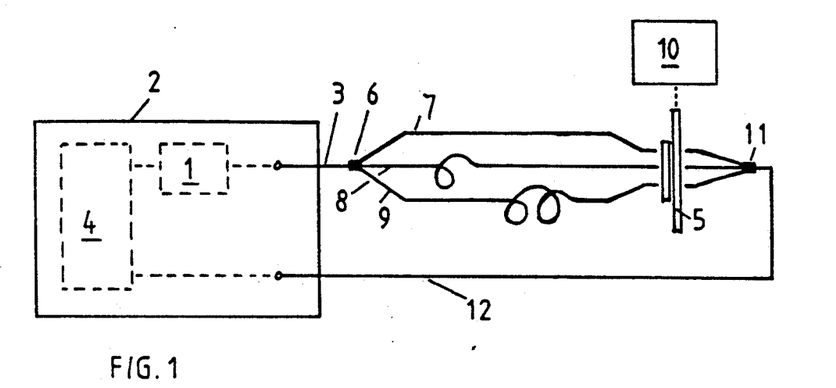
FIG. 1 shows schematically a system according to the invention such as might be used in a machine tool for measuring the linear displacement of a carriage on which a cutting tool is mounted.

Referring to FIG. 1 a laser light source 1 housed within control unit 2 supplies a modulated input to an optical fibre 3. The modulation is imposed by controlling the laser intensity in response to an electrical signal at 10.7 MHz. The details of the circuit associated with this modulating signal source will be described below by reference to FIG. 5, but it is noted here that this latter circuit has certain operational features which are of the form already described in the specification of U.S. Pat. No. 5,162,862. The electronic unit 4 represents the circuit disclosed in FIG. 5.

Figure 5:
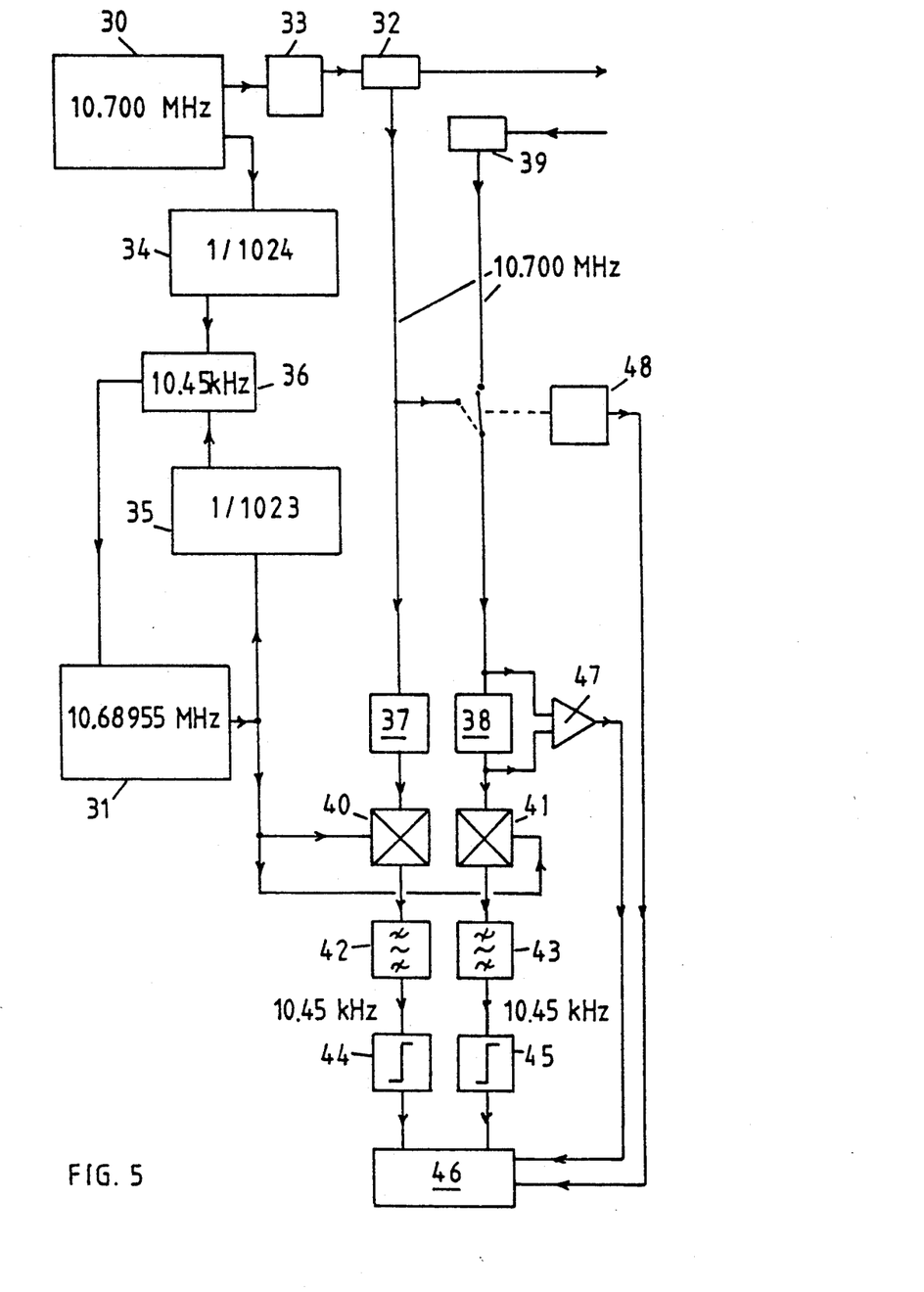
FIG. 5 shows schematically the heterodyne conversion system used in the system of FIG. 1.

The heterodyne conversion action of this unit 4 was intended in this earlier patent disclosure to provide a precise measure of the distance a propagated signal travels in transit to a target and in returning to a receiver adjacent the source. In its combination with the system, as shown in FIG. 1, it operates to measure the condition of a remote sensor, the Moire grating system 5, the merit of the combination arising from the fact that that condition as an optical signal intensity is translated into a phase shift which is the quantity measured on an extended time scale by the heterodyne unit 4.

The optical signal conveyed by the optical fibre 3 can be caused to divide to flow along three channels by connector 6 which couples with three optical fibres 7 and 8 and 9. In some applications it suffices to use only two channels and omit the fibre 9. In the latter case, fibre 8 is wound to provide a delay line so that at the ends of fibres 7 and 8 the optical signals have the same modulation frequency but the modulation of one signal is phase shifted by an amount up to 90 degrees relative to that of the other signal, the phase shift being predetermined by the added length of the delay line. This is provided by appropriate coiling of the optical fibre. Where the three fibres are used, fibres 8 and 9 would respectively shift the phase of the signal by 120 degrees and 240 degrees relative to that in fibre 7. The Moire grating system 5 comprises a fixed grating and a movable grating, the movable grating being attached to the work carriage 10 of a machine tool.

Figure 2:
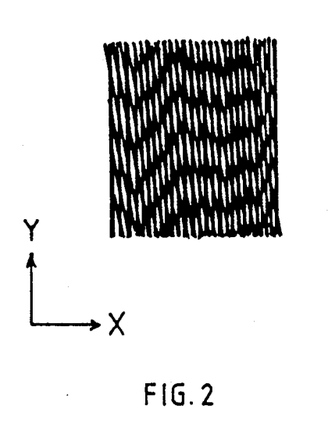
FIG. 2 shows what is meant by a Moire fringe.

FIG. 2 shows how two identical transmission gratings interact to create an optical pattern. Each grating consists of alternate opaque and transparent elements of equal width. If these gratings are placed face to face with their rulings inclined at a small angle, and viewed against a bright background, no light will be transmitted where the opaque parts of one grating overlap the transparent parts of the other. There is, however, an optical pattern formed by so-called 'Moire' fringes. As the movable grating slides across the other grating in the X direction, so the fringe pattern travels in the Y direction. For a small angle of inclination of the rulings on the respective gratings, a small displacement in the X direction can be sensed as a quite large change in the pattern in the Y direction. Therefore light throughput sensed by detectors spaced in that Y direction by a Moire fringe interval can be sensitive to the X movement through the much smaller spacing distance of the rulings on the gratings.

Referring again to FIG. 1, this shows three optical fibres (not numbered), the input ends of which are positioned to sense light rays transmitted through the grating system and sourced in fibres 7, 8 and 9 respectively. The optical signals carried by these three optical fibres are combined by superimposition using the connector 11 and form a composite signal which is the return signal supplied along optical fibre 12 to the control unit 2.

The overall effect of this arrangement is that the signal sent out on optical fibre 3 is subjected, in its transit around the circuit and through the intensity attenuating transducer formed by the Moire fringe grating system 5, to a phase shift which is partially attributable to the delay line feature and partly due to the sensing of the Moire fringes. By measuring that phase shift, and allowing for the delay line shift as a scale reference, the measurement can be interpreted as a measure of the displacement of the work carriage 10.

By using the three light paths the full cyclic range of phase is sensed and this allows the system to scan numerous Moire fringe wavelengths and so measure what can be quite large displacements in the machine tool. Were only two light paths used then the range of measurement would be over a range of intensity variation not associated with cyclic change, an example of which will be mentioned by reference to FIGS. 3 and 4.

The role of the heterodyne unit 4 is to measure that phase shift with very high precision. The test results from a system working on these principles are such that the Moire grating system limits the resolution obtainable by virtue of the possible variation of the grating angle. Owing, however, to the fact that such very high precision and stability can be achieved in the electronic system of the heterodyne unit 4, there are distinct advantages overall if the Moire fringe grating system is adapted in a way not subject to the angle setting of the rulings of the gratings. This is possible if the two interacting gratings have rulings of slightly different pitch. Then the Moire fringes are spaced in the X direction of FIG. 2 and the two optical ray paths need to be spaced in the X direction in appropriate relation to the fringe width.

There is much to be gained by desensitizing the angular dependence of the Moire fringe transducer and using the beat frequency effect of a grating system using parallel rulings of different pitch. It has been found advantageous, therefore, to compromise the design and sacrifice some of the resolution power of the heterodyne system to exploit a more reliable operation of what is a down graded implementation of the Moire fringe arrangement. This, therefore, is an important feature of the subject invention. It will be understood by reference to FIG. 2 that slightly inclined lines on the two gratings, if of equal pitch, will result in the dark fringe patterns travelling in the Y direction as the movable grating moves in the X direction. However, it requires very little fluctuation in the alignment of the gratings to cause the Moire fringe pattern to drift in a way which would introduce significant error in position sensing based on the movement of fringes in the Y direction.

The fringe pattern in FIG. 2 has been drawn with this in mind. The left hand side of the pattern shows a drift. Although the alternative grating pattern based on mutually parallel lines of different pitch is not shown in the drawings, it is deemed that one can readily picture the effect of the fringes that would form in the latter case. They would be spaced in the X direction and affected by motion in the X direction, but their spacing would be regulated by the precision with which the pitch rulings on the gratings are applied in manufacture. This is not a variable affected by machine operation. Any operational irregularity of the pattern drift in the X direction would merely represent a non-amplified position change of the very machine part and it is this that one seeks to measure.

Figure 3:
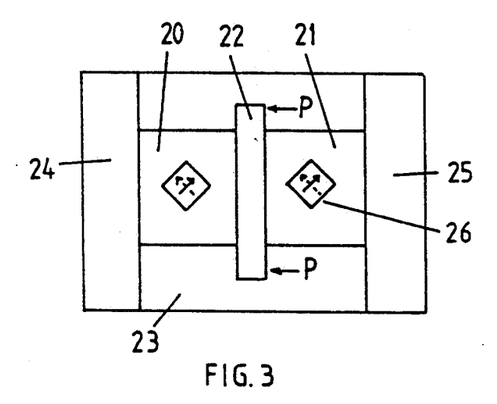
FIG. 3 shows a plan view of an optical strain gauge device which could be used with the invention.
Figure 4:
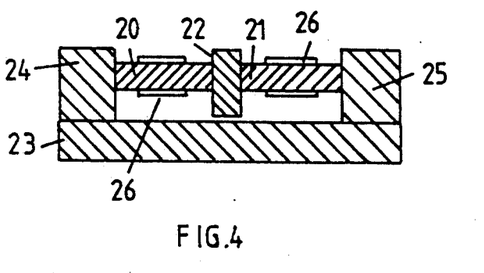
FIG. 4 shows a side sectional view of the device of FIG. 3.

Before explaining the operation of the heterodyne conversion system of FIG. 5, the optical strain gauge sensor application shown in FIG. 3 and 4 will be described.

The sensor comprises an assembly of two blocks 20, 21 of photo-elastic material disposed on either side of a metal arm 22 to which a force or strain action is to be communicated. The base plate 23 of the sensor has two end brackets 24, 25 which clamp the assembly in position and assure it is kept under compression. A force P applied in the direction shown will, therefore, put one block 20 under additional compression whilst reducing the compression force on the other block 21. This action affects the polarization properties of the photo-elastic material constituting the two blocks.

On opposite faces of each of the blocks 20, 21 there are gratings 26 which act as polarizing filters. The gratings on the opposite faces are ruled at right-angles to each other (as depicted by the cross arrows) and so block light passage not subject to change of polarization in intermediate transit. However, owing to the effects of stress applied to the photo-elastic material, there is a relative change of polarizing action as between the two blocks. The result is that, as a function of the force or strain applied to the metal arm 22, light rays directed to pass through the gratings and through the blocks sandwiched between the pairs of gratings will be affected. Provided, therefore, the relative attenuation of intensity of two light rays passing each through a block can be measured, this will be a measure of the force and so the device will act as a strain gauge. Its effectiveness depends upon the precision with which the attenuation of the light intensity in transit through the sensor can be measured. It will, therefore, be understood from analogy with the three-path optical system of FIG. 1 how two optical fibres (not shown in FIGS. 3 and 4) can be positioned in relation to the optical elements of the strain sensor to direct light to pass through blocks and how the light signal in transit can be captured by two optical fibres providing the output signal.

Referring now to FIG. 5, there are two crystal oscillator circuits 30, 31 both of which operate nominally at 10.7 MHz. The crystal oscillator in circuit 30 is the primary oscillator producing the reference frequency which, in this case, is used to amplitude-modulate the optical output from a laser 32. Circuit 33 is located in an output channel between circuit 30 and laser 32 and provides the optical drive for laser modulation. Separately, via another output channel, circuit 30 supplies an input to a frequency divider chain 34 which is part of a phase-locked indirect frequency synthesizer. This divider chain 34 generates an output having a phase fixed in relationship to that of the primary oscillator but a frequency which is 1/1024 of that frequency.

The crystal oscillator in circuit 31 is subject to voltage control and produces a signal whose frequency and phase are subject to very sensitive response to this controlling voltage. The secondary oscillator is controlled to oscillate at a slightly lower frequency than the nominal 10.7 MHz, lower by some 10.45 kHz. The output from this oscillator is supplied along two channels, one of which feeds a frequency divider chain 35 which is also part of the phase-locked indirect frequency sythesizer. This divider chain 35 generates an output signal having a fixed phase relationship to that of the secondary oscillator but a frequency which is 1/1023 of that frequency.

The objective of this circuit arrangement is to so control that voltage on the secondary oscillator as to assure that the two signals produced by the divider chains 34 and 35 are identical and have no phase difference. Accordingly, the signal outputs from chains 34 and 35 are supplied to the phase comparator circuit 36 which responds to slight variations in relative phase so as to adjust the voltage signal supplied to the secondary oscillator in circuit 31.

Ceramic filter circuit 37 receives an input at the frequency of the reference crystal oscillator 30, taking this input directly from the circuit of laser 32. Ceramic filter circuit 38, forming part of a parallel circuit identical in all respects, except for a fine-tuning feature to be described, receives as input signal the output from photodetector circuit 39. The latter receives the incoming version of the optical signal transmitted by laser 32 and produces a 10.7 MHz signal at the primary or reference frequency derived from modulation of the light signal. Photodetector circuit 39 includes appropriate amplification stages and serves to produce an electrical output signal of similar strength to that supplied to filter circuit 37 with negligible phase shift.

In the referenced disclosure of U.S. Pat. Ser. No. 5,162,862 a reflecting surface was the target for an optical beam, but the technological principles apply equally to an outgoing signal supplied as an optical ray in passage through an optical fibre. In this case the target surface is replaced by the Moire grating system 5 of FIG. 1. In this case the action involves rays emerging from the ends of optical fibres in close proximity to the gratings. These rays pass through the grating and are subject to the attenuation of intensity of this occultation system before entering as input to optical fibres positioned to provide a return path for the optical signal incoming through optical fibre 12 to enter the unit 4 by input to the photodetector system at 39 in FIG. 5.

The ceramic filters in parallel circuits 37 and 38 obstruct all but the pure sinusoidal form of the 10.7 MHz received signals. Thus the outputs from ceramic filter circuits 37 and 38 are complementary signals at the same frequency 10.7 MHz and have a phase difference which is directly proportional to the distance being measured based on speed of light propagation time.

These ceramic filters are a most important feature in the circuit combination providing the optimum advantages of this invention.

Both of the output signals from the ceramic filters should be subject to the mixing action needed to implement the heterodyne operation and a full description of that mixing action is given in the specification of U.S. Pat. Ser. No. 5,162,862.

The second channel 10.68955 MHz signal output from the oscillator 31 is supplied to mixer circuits 40 and 41 which receive outputs from circuits 37 and 38, respectively. These convert the 10.7 MHz reference and photodetector signals to a frequency of 10.45 kHz, whilst retaining the differential phase information. The 10.45 kHz bandpass filters 42, 43 reject spurious mixing products from mixer circuits 40, 41, respectively. High gain limiting amplifiers 44, 45 generate square wave output signals and these are fed to the timing and processor circuit 46 which is used for the signal intensity measurement.

The operation of the circuit shown in FIG. 5 will be understood from the known principles of heterodyne conversion upon which the system is based. The combination of the sythesizer technique for phase-locking the two oscillators and the heterodyne down-conversion process implemented via the mixer circuits 40, 41 and the bandpass filters 42, 43 operates to make the ultimate measurement very precise as a measure of the phase shift resulting from the attenuation of intensity of the light signal at the test position.

Since the application shown in FIG. 1 is to the measurement of displacement in a machine tool and the tool is constantly undergoing change of position, it is beneficial to incorporate in the design some means for measuring rate of change of that displacement. If the data processing controlling the measurement takes several data samples in rapid succession and computes an average for regulated control purposes, then this process can be made far more precise and implemented with ease with the particular circuit structure used in FIG. 5. The ceramic filter of circuit 38 is set slightly off-tune with respect to the 10.7 MHz reference frequency of ceramic filter of circuit 37. As a result of this there will be a small voltage difference as between the input and output of circuit 38 and this voltage will be a measure of the rate at which the phase of the signal is changing. Bearing in mind that phase is a measure of displacement, this voltage becomes a measure of velocity and this is a valuable input quantity in extrapolating to correct measurements made under rapidly changing conditions. Accordingly, in FIG. 5 the connections across circuit 38 provide input to an amplifier 47 which supplies a data input signal to the circuit 46. The processor in circuit 46 computes updated values of the measured displacement and in a machine tool application provides control signals needed to regulate the cutting tool.

The switch controller 48 in FIG. 5 serves periodically to supply identical signals as input to the parallel circuits and so provides a calibration facility needed to test the matched operation of both circuit paths and thereby facilitate regulating adjustments.

The methods of measurement of displacement described above have been incorporated in prototype structures and the reliability and high precision of the measurement has been verified, both for the system shown in FIG. 1 and that described by reference to FIGS. 3 and 4. The circuit of FIG. 5 is basic to both measurements.

From the viewpoint of advancing the art, there is a major advance in that the use of a single light source with passive delay components has made the sensing of position in terms of a 90 degree (quarter wavelength) scan of a single Moire fringe spacing possible using the FIG. 5 circuit with a resolution of one part in 3500. Conventional Moire fringe interpolation is capable of resolution to only one part in 100 per fringe.

With the three optical light fibre circuit paths of FIG. 1 the full 360 degree scan of a Moire fringe is possible and resolution to one part in 14,000 can be obtained. A second phase measurement system can be arranged to work in conjunction with the first system to read a second Moire grating of much larger pitch to give longer range scale data.

The direct velocity measurement feature which utilizes the off-tune ceramic filter output via amplifier 47 can sense and measure a velocity of 1 nanometer per second for a 10 micron grid grating pitch. Thus when the index grating of the Moire fringe system travels across the standing grating the output from the phase sum will be a reduced carrier modulation frequency for a clockwise phase change and a higher frequency for a clockwise phase progression. Techniques of doppler frequency measurements are well established in the art and are easily accomplished with very high precision and so the velocity measurement can be very precise. When this is combined with the direct displacement measure, the normal difficulty of any system which uses an averaging algorithm to present an output measure is overcome. Good data can be obtained whilst the system is in motion owing to the extrapolation possible in computing change of position. Given this feature one can then design a system to perform its own diagnostic tests whilst transiently relying on the extrapolation data. Thus the switch controller 48 can be used to calibrate the operation of the circuit in an ongoing operational test environment. Furthermore a machine tool can be operated from a datum position and the position data plus the rate of change of position data used over a range of displacement to perform verifying checks on the Moire grating system to assess if it is affect as by heat expansion.

Essentially, therefore, the invention as so far described provides a very precise means of measuring displacement in machines used in an industrial environment. The merit of the invention lies in the achievement of such very high measurement precision using speed-of-light action in what is essentially a passive component system. The particular circuit configuration based on the ceramic filters and the crystal oscillators with the heterodyne conversion and phase-lock linking the two receiver channels with the transmitter performs in a quite remarkable way in tests and yet uses standard radio circuit components. Though first designed for use in a radar-type of range measurement based on modulated light rays reflected from a target, the circuit has proved surprisingly adaptable to the much more important field of industrial application which is the subject of this invention. Measurements of displacements with nanometer resolution have been brought within the ambit of an industrial environment suited to optical fibre technology.

The remainder of this description will be directed to the specific application of relative light intensity measurement to the photoelastic load cell.

The photoelastic load cell as used in this invention comprises a birefringent photoelastic material. This means that there are three mutually perpendicular stress planes and that the stress planes have different optical response properties in relation to stress. If there are three mutually orthogonal stress axes x, y, z, a plane polarized incident light beam travelling through such a substance along the z axis will emerge as two waves, the light beam being split into an ordinary wave travelling at the normal speed of light in the medium and polarized perpendicular to the z axis (polarization being in the x direction) and an extraordinary wave polarized in the y direction. The extraordinary wave is retarded by a factor dependent upon the stress optical coefficient of the medium and the magnitude of the stress.

The significance of this is that, provided the separate light output intensity of these two waves is sensed, by processing the waves through separate polarizing filters each having its own photo-detector, the relative magnitude of the two signals becomes a measure that can be translated to represent the state of stress in the load cell. Note that the rate at which energy is delivered by a light wave is a function of its speed and so the intensity sensed relates to the refractive index and so the stress. Whereas photodetectors can be used to measure the two optical signals to provide data which can be interpreted as a stress measurement, the preferred implementation of this invention is one for which the relative signal strengths are measured by a rather special technique involving heterodyne phase sensing.

Figure 6:
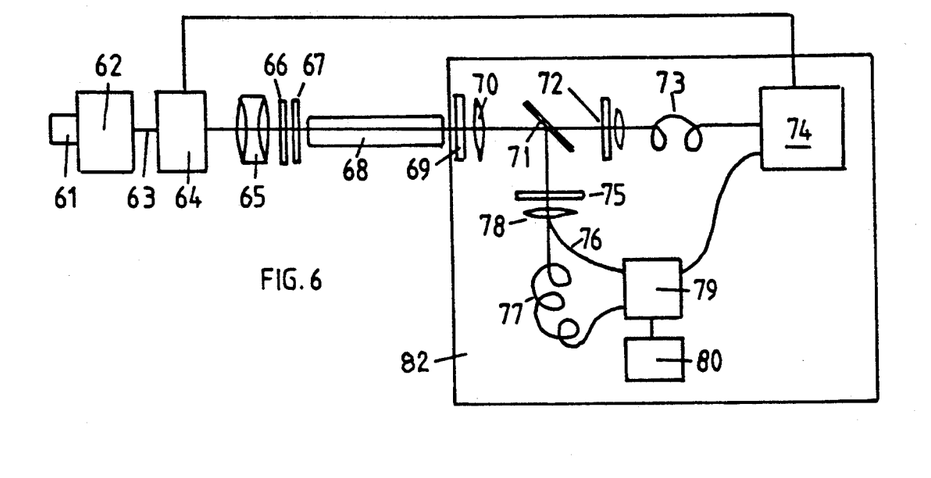
FIG. 6 shows a schematic optical circuit arrangement embodying the invention and using a single laser input source with a two-way-divided phase-delay.

This will now be described by reference to FIG. 6. In FIG. 6, a monochromatic light source such as a laser diode 61 is modulated by a heterodyne conversion unit 62 and the modulated optical output is transmitted through the optical fibre 63 and thence through a phase modulation detector 64 on through a collimator 65. After collimation the optical ray passes the plane polarizing filter 66 and thence through the quarter wave plate 67. From there the ray passes through the photoelastic transducer or load cell 68 and then through a further quarter wave plate 69. Note that the quarter wave plates 67 and 69 are optional in the sense that they are only required if the load cell 68 is likely to experience forces from unexpected directions.

The emerging light ray is then passed through a beam spreader 70 which guides the ray into a beam splitter 71 which divides the ray along two separate optical paths. The beam splitter 71 may be a semi reflective-mirror. One of the emergent beams is guided through a polarizing filter 72 with its plane of polarization set at an angle suitable for the range of the transducer. Normally this angle is the same as that governing the setting of plane polarizing filter 66. Thereafter the beam passes through the optical fibre 73 before entering as input to the mixer circuit 74.

The other emergent beam from the beam splitter 71 is similarly guided through a polarizing filter 75, which is set, by adjustment, to an angle suitable for best results, and is collected in optical fibres 76 and 77. A lens 78 may be used to assist the efficiency of the light path. Fibres 76 and 77 pass through a light gate 79, under the control of an input from control circuit 80. This control circuit determines whether to pass light from fibre 76 or 77 on to the mixer circuit 74.

The role of the mixer circuit 74 is to recombine the light beam passing through filter 75 with its counterpart passing through filter 72 and, by a summing operation, generate a signal having a modulation that represents the phase-shift referenced on that sensed by detector 64.

In operation, when the control circuit 80 is activated to pass light through fibre 76, the mixing of the beams, with their phase differences, results in a reference condition or phase that is constant irrespective of the stress condition of the photoelastic transducer, load cell 68. However, if the beam guided through fibre 77 is allowed to pass, the mixing of the beams in mixer circuit 74 affords a phase measure which represents the stress condition of the load cell 68.

Note that the optical fibres 73, 76 and 77 have different optical path lengths. The object is to measure the relative intensity of two light signals and, by appropriately mixing two signals of the same frequency derived from the same optical source, the relative intensity can be translated into a measure of relative phase.

As noted above, the invention here exploits a feature of photoelasticity, whereby the difference in stress along two principal axes of the load cell is represented by the difference in refractive indices along those axes. Given a monochromatic optical signal, the wavelength is proportional to refractive index and time rate of change of wavelength difference is a phase difference.

Now, when a sinusoidal signal is divided to pass along two separate paths and they are added, after one has been retarded in phase relative to the other by 90°, they combine to produce a composite signal, the phase of which, is a function of the relative amplitude of those merging signal components. It follows that if one can measure the phase shift with high precision one can thereby measure the relative strengths of those two signal components.

The loop feature of optical fibres 73 and 77 in FIG. 6 signify propagation delays (corresponding to the above 90° phase shift, which are set to determine the phase shift needed at the optical frequency of the light source to optimise the stress sensing measure.

Figures 7, 8:
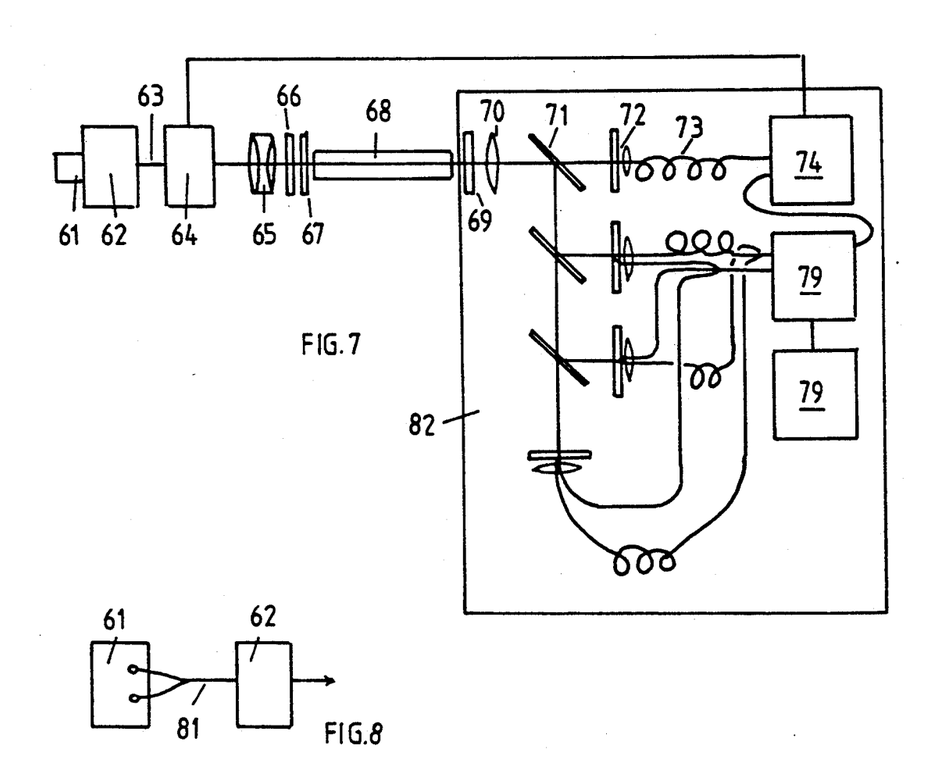
FIG. 7 shows a schematic optical circuit arrangement embodying the invention and using a single laser input source with a four-way-divided phase-delay.
FIG. 8 shows a schematic representation of part of an optical circuit arrangement embodying the invention and using a dual laser input source having two monochromatic frequencies and which can serve as input to the circuits of FIG. 6 and FIG. 7.
Figure 9:
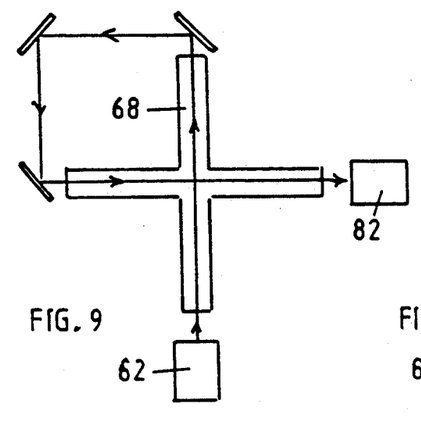
FIGS. 9, 10, 11 and 12 show a series of different load cell configurations which can be used in conjunction with the apparatus provided by this invention as described by reference to FIGS. 6, 7 or 8.
Figure 10:
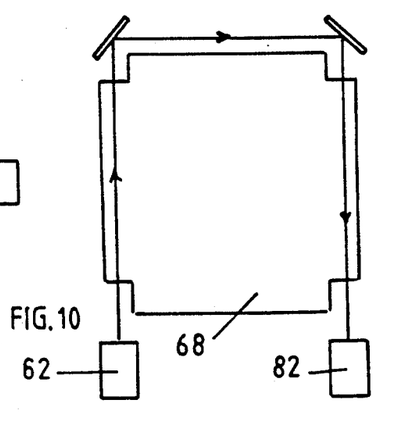
Figure 11:
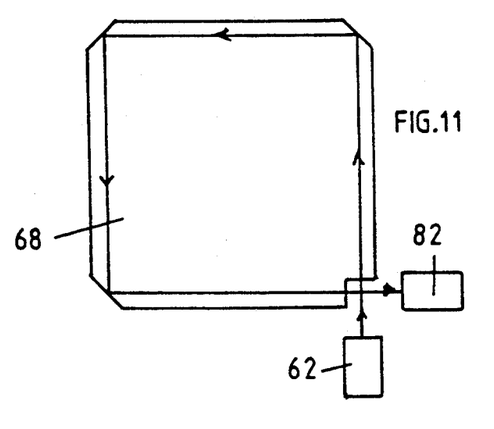
Figure 12:
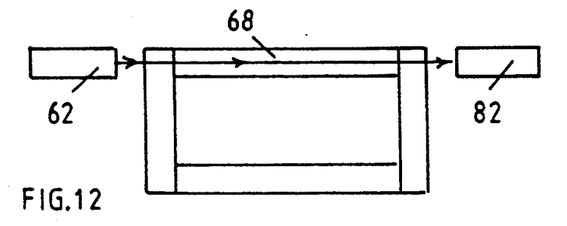

To build a system having greater resolution in load cell stress measurement, the arrangement shown in FIG. 7 can be used. This is, in principle, similar to that of FIG. 6 and similar notation is used to identify the components. There are, however, additional beam splitters and optical fibre paths. The system involves a triple split fibre link providing three paths which introduce delays that are, respectively, of one-quarter, one half, and three-quarter wavelength duration in relation to the path through fibre 73.

The operation of this configuration has the advantage of greater resolution in the stress measurement obtained and a linearization of the output signal relationship with stress being measured, achieved as a result of the steady roll of phase that occurs owing to the sequential extinctions of the filters which are set at 30°, 60° and 90°, respectively. However, this arrangements suffers from the disadvantage of being more complex than that of FIG. 6.

In another embodiment of the invention, as shown schematically in FIG. 8, there are two laser sources which have chromatic frequencies differing by a small amount, possibly 10%, but typically determined by the characteristics of the lasers that are inexpensive and readily available commercially. For example, a 670 nanometer wavelength laser and a 660 nanometer wavelength laser can be used. These two lasers send their respective outputs through separate optical fibres but these outputs are combined along a common optical fibre 81 which supplies input to the heterodyne conversion unit 62. The remainder of the system (not shown) is then much the same as that of either FIG. 6 or FIG. 7. The extinction phases which are now sensed will be those determined by the beat frequency signal developed from the two laser sources.

In operation, with such a system, the increments of the forces or stress on the load cell 68 can now be measured by counting the beat frequency extinction phases developed by mixing of the polarized and retarded signals generated by the two lasers. This allows the resolution of the measurement of load cell stress to be multiplied by the ratio of the beat frequency to the monochromatic frequency, which is advantageous for high loads when the size of the transducer is important.

Furthermore, by selectively switching off or obstructing the output of either laser, or bypassing the retardation loops through the optical fibres, the measurement can be calibrated by suitable electronic control (not shown) and the resolution regulated to suit measures over different scale ranges.

Note that, where the two laser system is used, both lasers are modulated by the same radio-frequency signal and that the facility offered by the two laser system will, normally, function with a single laser to determine a coarse value of position or load and the second laser output will be switched into action when the fine range measurement is needed.

FIGS. 9, 10, 11 and 12 depict, schematically, how a photoelastic load cell can be configured in relation to the optical paths of the system associated with interrogation circuitry. In each case the assumption is that, as viewed, there is a downward load or pressure acting on the load cell and the resulting strain patterns in the body of the cell affect the optical properties along the axes corresponding to the various ray paths.

In each of FIGS. 9 to 12 the light ray source 62 sends its output around a path through the body of the load cells 68 via reflecting surfaces (where necessary) and thence to the unit 82 depicted by the rectangular block in FIGS. 6 and 7. The connection between phase modulation detector 64 and mixer circuit 74 shown in FIGS. 6 and 7 provides a modulation phase reference signal for the purposes already explained by reference to FIG. 5.

Though not described by reference to the drawings, there are holographic techniques by which the focusing and polarizing roles of certain of the optical components can be combined into a single element. Thus a hologram formed as a coating on the input end of the photoelastic load cell 68 could serve to replace the functions of the collimator 65 and both the polarizing filter 66 and quarter wave plate 67. It is to be understood, therefore, that reference in the following claims to such optical components as discrete elements of the apparatus is intended to be construed as implying also functionally equivalent configurations, particularly where one or more hologram are used in the optical ray path for polarizing and focusing functions.

Important applications of photoelastic load cells of the form provided by this invention are in weighing machines and pressure transducers, where it is important that the operation remains reliable and immune from residual effects of external electrical and magnetic disturbances. The use of optical transducers has, therefore, particular advantages but the practical application of the invention described above owes much to the technology by which inexpensive compact solid state electronic and optical structures can now be fabricated. The invention allows that technology to advance into fields of application which have seen little change in recent decades.

An inherent advantage of the photoelastic load cell application arises from the division of the laser input energy between two differently polarized ray components traveling along the same ray path through the photoelastic load cell. The load condition of the cell determines the ratio of the wave intensities of the rays emerging from the cell, but, when these are recombined to produce a signal having a phase referenced on that of the laser input, the resulting signal has an amplitude that is not phase-dependent. The load measure is therefore essentially that represented by the phase measurement and the measurement by the heterodyne conversion circuit is thereby facilitated owing to the need for the test signal and the reference signal to have amplitudes that are in matching relationship.

I claim:

1. Electrical measurement apparatus in which the condition or position of an optical transducer element is represented by the relative attenuation of the intensities of two optical signals both derived from a common laser source which produces a light ray amplitude-modulated at a radio frequency, comprising (a) circuit path means for dividing an input from the laser source between a plurality of circuit paths each conveying a transmitted signal at the speed of light (b) propagation delay means in at least one of the paths for retarding the respective transmitted signal, whereby the transmitted signals have different phase at the radio frequency (c) an optical transducer element positioned in the paths of the transmitted signals and operative to adjust relative signal intensity in dependence upon the state of the apparatus requiring measurement and as determined by that transducer, (d) circuit means for recombining the transmitted signals after attenuation to provide as a received signal a single electrical output, and (e) signal processing means for measuring the phase of the electrical output relative to the radio frequency modulating signal input controlling the laser and interpreting this to provide the required measurement, the signal processing means incorporating (f) heterodyne conversion means, whereby a phase-locked version of either the signal input or the electrical output is mixed with the other in each of a pair of mixer circuits to produce two throughput signals having an extended time-spaced measure of the phase.

2. Apparatus according to claim 1, wherein the circuit path means divide the input between two circuit paths and the propagation delay means in one path comprise an extended path length which is effective at the propagation speed of the optical signal to retard its modulation waveform in that path by a quarter wavelength relative to that of the signal in the other path.

3. Apparatus according to claim 1, wherein the circuit path means divide the input between three circuit paths and the propagation delay means in two of the paths comprise extended path lengths which are effective at the propagation speed of the optical signals to retard their modulation waveforms by one third of a wavelength and two-thirds of a wavelength, respectively, relative to that of the signal in the other path.

4. Apparatus according to claim 1, wherein the signal processing means for measuring the phase of the electrical output relative to the signal input comprise (a) timing means (b) an electronic circuit controlling the timing means and incorporating detector means responsive to said signal input and said electrical output to provide a measure of their relative phase shift, (c) signal amplitude control means for adjusting the amplitude of at least one of the electrical input or the electrical output to bring their strengths into matching relationship and (d) two separate frequency conversion means of similar design, one being connected to respond to the signal input and the other being connected to respond to the electrical output to frequency-shift both by an identical reducing amount before they are supplied to the timing means, whereby to provide the phase input to the timing means at a longer wavelength and so extend the time measure representing phase, there being two parallel circuits, one through each frequency conversion means, and each comprising a ceramic filter and a mixer circuit but characterized in that one ceramic filter has fine-tuning control means and is slightly offset in frequency tuning with respect to the other ceramic filter, whereby to provide a speed data signal representing the rate at which the measured phase changes, which signal provides data processing input for interpretation in the signal processing means in providing the measurement and whereby the ceramic filters each obstruct throughput of all but a pure sinusoidal signal which is fed onwards as input to a corresponding mixer circuit, where it is subjected to heterodyne downconversion of frequency by mixing with a signal of a different control frequency supplied to both mixer circuits, the resulting output signals from these two parallel circuits providing the inputs for phase difference measurement in the timing means, whereby a phase-locked version of either the signal input or electrical output is mixed with the other to produce an extended time-spaced measure of their phase difference.

5. Apparatus according to claim 1, wherein the optical rays from the laser source are carried by optical fibres, divided along different paths and merged into a single ray after passage through an optical occultation system and the laser source has its optical output modulated in intensity sinusoidally at a high MHz frequency to provide a signal input characterized in phase by the waveform of the modulation at the MHz frequency and the propagation delay arises from the passive action of transmission through an optical fibre coiled to provide added path length, the modulation waveform being the basis of the phase-lock action when processed electronically in the heterodyne conversion means.

6. Apparatus according to claim 4, wherein the heterodyne conversion means derives its signal input to the relevant mixer circuit from direct connection between the laser and a ceramic filter supplying the mixer circuit, whereby the heterodyne conversion means operates with phase-locking as between a transmitting source and both receivers comprising the two mixer circuits.

7. Apparatus according to claim 2, wherein the optical transducer element is a photoelastic sensor used for the measurement of mechanical stress, and the signal attenuation means comprise two coacting stress sensor elements formed from photo-elastic material rigidly coupled to a stress input arm which when subject to an applied force affects the stress in the two elements differentially and thereby causes the light attenuation properties of one element to vary with respect to that of the other element in measure related to the applied force.

8. Apparatus according to claim 7, wherein the sensor elements each have light polarizing gratings, mounted on opposite surfaces and arranged in a cross-polarized manner on these opposite surfaces in a light ray path so that in the absence of applied stress affecting an element light throughput is obstructed, but when stress is applied to modify the light polarizing action of the element the overall light attenuation property of the element changes with applied stress to thereby facilitate the stress measurement in terms of that attenuation.

9. Apparatus according to claim 1, wherein the optical transducer element is a load cell of photoelastic material, and there is a monochromatic laser source of polarized light providing input along a ray path through the load cell, and a plurality of polarizing filters are incorporated in light intensity sensing means positioned to sense the light output from the ray path after passage through the load cell, said light intensity sensing means being responsive to the relative intensity of the separately polarized components of the light output as supplied through the different polarizing filters, and electronic circuit means provide output data representing a measure of that relative intensity as an indication of a stressed condition of the load cell.

10. Apparatus according to claim 9, which incorporates two laser sources having different monochromatic frequencies which provide two optical signals which provide a supplementary test facility to supplement the primary measure using a single laser source, the two optical signals being, for the purpose of this supplementary test, merged into a composite light ray as input to the load cell, both optical signals being amplitude-modulated by the same radio frequency signal, whereby, owing to the extended wavelength of their beat period, a beat frequency signal set up between the two monochromatic frequencies serves as a fine measure of a load condition producing that stress condition thereby increasing the resolution sensitivity of the measurement.

11. Apparatus according to claim 5, wherein the optical occultation system, which is the optical transducer element acting as a signal attenuation means, comprises a Moire fringe grating system.

12. Apparatus according to claim 11, in which the Moire fringe grating system comprises interacting gratings having grating patterns formed by lines which are mutually parallel as between two gratings but which are of slightly different pitch.

13. Electrical measurement apparatus in which the load condition producing strain in a photoelastic load cell is measured by transmitting a polarized laser-generated optical signal through the load cell, the apparatus comprising a laser source, circuit means connected to regulate the laser power to amplitude-modulate the laser-generated optical signal at a radio frequency and thereby also produce a reference signal at the radio frequency as a phase reference, optical polarizing filter means positioned in the path of the optical signal output from the load cell for responding selectively to the separate optically polarized ray components of the signal emerging from the load cell, circuit path means for guiding the separate ray components along separate paths, at least one of which has a delay characteristic which retards the phase of the radio-frequency modulation of the transmitted ray component, circuit coupling means for recombining the ray components by merging their signal waveforms, thereby producing an electrical signal having a phase related to the relative intensity of the radio-frequency modulation of the two ray components, and signal processing means for measuring the phase of that produced electrical signal relative to the phase of the reference signal.

14. Apparatus according to claim 13, further comprising heterodyne conversion means, whereby a phase-locked version of either the reference signal or the produced electrical signal is mixed with the other in each of a pair of mixer circuits to produce two throughput signals having an extended time-spaced measure of the phase.

* * * * *